United States Patent Office 2,925,399
Patented Feb. 16, 1960

2,925,399

COMPOSITION COMPRISING A MIXTURE OF AN ELASTOMERIC COPOLYMER OF BUTADIENE AND A THERMOPLASTIC COPOLYMER OF STYRENE AND ACRYLONITRILE AND PROCESS FOR PRODUCING SAME

Paul Schneider, Opladen, Gottfried Scriba, Leverkusen-Wiesdorf, and Wilhelm Graulich, Leverkusen-Bayerwerk, Germany, assignors to Farbenfabriken Bayer Aktiengesellschaft, Leverkusen, Germany, a corporation of Germany No Drawing. Application July 3, 1956
Serial No. 595,593

Claims priority, application Germany July 9, 1955

4 Claims. (Cl. 260—45.5)

The present invention relates to new compositions of thermoplastic and elastic synthetic polymers, and to the production thereof.

Thermoplastic synthetic polymers, such as polystyrene or copolymers of styrene and acrylonitrile are too brittle for many fields of application, because of their low impact strength and impact strength notched. This disadvantage can be substantially overcome by addition of rubberlike elastomers, for instance copolymers of butadiene and styrene or of butadiene and acrylonitrile to polystyrene or to the copolymer of styrene and acrylonitrile (compare U.S.P. 2,439,202).

The aforesaid blends of high molecular weight polymers have recently gained increasing technical importance. As compared with thermoplastic polystyrene or the copolymer of acrylonitrile and styrene, the said blends show besides increased ductibility an essentially improved impact strength and impact strength notched, whereas other mechanical properties, for instance their hardness, thermal stability or properties in the electric field are only slightly affected. However, on account of their greater hardness, higher stability to thermal influences, to solvents or atmospheric influences as well as their compatibility with other polymers containing polar groups, the blends containing acrylonitrile show considerable advantages over mixtures of butadiene and styrene.

If, however, the rubber-like copolymer of butadiene and acrylonitrile is entirely soluble in solvents such as toluene and methylethylketone, the processing of the mixture of both elastomeric and thermoplastic polymers involves difficulties. Articles of the aforesaid blends, which are molded in the heat, show a substantial shrinkage and a lack of smoothness in their surfaces. Therefore, it has been proposed to partially cross-link the rubber-like elastic component of butadiene and acrylonitrile before compounding this component with the thermoplastic copolymer of acrylonitrile and styrene by a thermal treatment at elevated temperatures on the rubber mill, or in an internal mixer, especially a Banbury mill or by subjecting butadiene and acrylonitrile to emulsion polymerization in the presence of a cross-linking agent such as divinyl benzene (compare U.S.P. 2,550,139 and U.S.P. 2,600,024).

The disadvantage of these processes is the long period required for the thermal treatment and the resulting substantial discoloration of the elastic copolymer. Besides, the cross-linkage of the butadiene acrylonitrile copolymer with divinylbenzene leads to the formation of blends having unsatisfactory mechanical properties if the thermal treatment step is omitted.

In accordance with the present invention it has been found that the disadvantages associated with the aforesaid prior art processes are overcome by using elastomeric copolymers of butadiene, acrylonitrile and at least one further ethylenically unsaturated monomer, for the aforementioned blends, said copolymers containing self-cross-linking groups bound to said further monomer radical. Under self-cross-linking groups we understand such groups which effect cross-linkage of the copolymers when heating the latter to temperatures of about 100–220° C. Such groups are for instance carbonyl groups, such as carboxyl, carbonamide, aldehyde groups, furthermore methylol groups, methylolether groups, dioxolane groups, ureido groups and groups of the formula:

$$\diagdown C \diagup \diagup \diagdown \substack{COR_4 \\ COR_5}$$

in which $R_4$ and $R_5$ stand for a hydrocarbon residue, which may be bound to the carbonyl group by way of an oxygen atom.

For producing said copolymers butadiene and acrylonitrile may be copolymerized with monomers containing said groups. Such monomers are for instance:

(1) Ethylenically unsaturated carboxylic acids, such as acrylic acid, α-chloromethacrylic acid, methacrylic acid, crotonic acid, sorbinic acid, cinnamic acid, maleic acid, maleic acid mono-alkylester.

(2) Amides of ethylenically unsaturated carboxylic acids, such as acrylamide, methacrylamide.

(3) Ethylenically unsaturated aldehydes, such as acrolein, methacrolein.

(4) Copolymerizable ethylenically unsaturated monomers containing at least one methylol or methylolether group preferably of the formula:

$$-OC-N-CH_2OR$$
$$\phantom{-OC-}|\phantom{-CH_2OR}$$
$$\phantom{-OC-N-}R_1$$

in which R stands for hydrogen or alkyl, such as methyl, ethyl, propyl, isopropyl, butyl isobutyl, hexyl, and $R_1$ for hydrogen, alkyl, aryl. Such monomers are for instance the alkylether of the methylol derivatives of acrylamide (compare Belgian Patent 539,963).

(5) Copolymerizable ethylenically unsaturated monomers containing at least one dioxolane residue in the molecule, as for instance compounds of the formula:

$$CH_2=C-COO.CH_2.CH\!-\!\!-\!\!-CH_2$$
$$\phantom{CH_2=}|\phantom{-COO.CH_2.CH\!-\!\!-}|\phantom{-\!\!-}|$$
$$\phantom{CH_2=}R\phantom{-COO.CH_2.C}O\phantom{\!-\!\!-}O$$
$$\phantom{CH_2=COO.CH_2.CH\!-}\diagdown C \diagup$$
$$\phantom{CH_2=COO.CH_2.CH}\diagup\phantom{C}\diagdown$$
$$\phantom{CH_2=COO.CH_2.CH}R_1\phantom{C}R_2$$

in which R stands for hydrogen or alkyl, $R_1$ and $R_2$ for hydrogen or a hydrocarbon residue, such as alkyl, cycloalkyl, aryl. Suitable compounds of this type are for instance isopropylidene-glyceryl, acrylate and methacrylate, methyleneglyceryl acrylate and methacrylate (compare U.S.P. 2,680,735).

(6) Copolymerizable ethylenically unsaturated monomers containing at least one ureido radical of the formula:

$$-NR_2-CO-NHR_2$$

in which $R_2$ stand for H or a hydrocarbon residue. Suitable compounds of this type correspond for instance to the following formulae:

(a) $\quad CH_2=C(R).COO-A-NH.CO.NH_2$ in which R stands for H or alkyl and A for an alkylene group, such as ethylene, propylene, isopropylene. Such compounds are for instance: β-ureidoethyl methacrylate and acrylate (compare U.S.P. 2,694,695).

(b) $\quad CH_2=CH.O-A-NR_3.CO.NHR_3$ in which A stands for a cycloalkylene group or for an ethylene group with 2–18 carbon atoms, and $R_3$ for hydrogen or a monovalent aliphatic or cycloaliphatic radical with 1–24 carbon atoms. Such compounds are disclosed in French Patent 1,075,898 and in U.S.P. 2,734,891. By way of example there may be cited: Ureidoethylvinyl ether, 3-ureidopropylvinyl ether, β-ureidoisobutylvinyl ether, N-cyclohexylureidoethylvinyl ether, N-(2-vinyloxyethyl)-N'-ethylurea.

(7) Monomers of the formula:

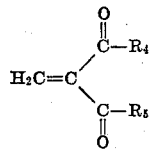

in which $R_4$ and $R_5$ stand for a hydrocarbon radical, which can be bound to the carbonyl group by way of an oxygen atom. Such compounds are for instance the methylene derivatives of malonic acid esters, acylacetic acid esters, such as acetoacetic acid ethylester, acylacetones, such as acetylacetone. These compounds may be obtained by heating compounds of the general formula:

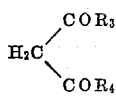

in which $R_3$ and $R_4$ have the above meaning with paraformaldehyde in the presence of catalytic amounts of fuller's earth, whereafter the water present in the reaction mixture is distilled off azeotropically and the residue is worked up in known manner.

The elastic copolmers used for the production of the blends of the present invention are preferably composed of 5–45 percent by weight of bound acrylonitrile, about 0.1 to 20 percent by weight of bound monomers with self cross-linking groups, the rest being bound butadiene. Copolymers of this type can be readily converted into an insoluble gel by heating them for a short period of time to temperatures ranging from about 140–170° C. The elastic copolymers are preferably produced by the process of emulsion polymerization according to known methods in an aqueous medium in the presence of catalysts, emulsifying agents and modifiers. Instead of butadiene there may be used homologues or derivatives of butadiene, such as isoprene. Moreover, it is possible to replace part of the mentioned monomers by other ethylenically unsaturated monomers, such as vinylchloride.

As pointed out above the elastic copolymers contain about 0.1–20 percent by weight of bound monomers with self-cross-linking groups. The preferred range is about 1–10 percent by weight. In addition monomers which act as cross-linking agents when they are copolymerized with other monomers, such as divinylbenzene, glycoldiacrylate, may be used as copolymerizing components in the production of the elastic copolymers. Generally speaking, these monomers have no essential effect on the physical characteristics of the present blends.

These blends are preferably composed of about 10–75 parts by weight of the aforementioned elastic copolymers and of about 90–25 parts by weight of a thermoplastic copolymer, preferably of a copolymer acrylonitrile and styrene containing 5–45 parts by weight of bound acrylonitrile. These thermoplastic copolymers may be produced by the emulsion polymerization procedure as disclosed for instance in U.S. Patent No. 2,140,048 in an aqueous medium in the presence of an emulsifying agent, a polymerization catalyst and a modifier.

The styrene in the above copolymers may be replaced at least partially by styrene derivatives, such as α-chlorostyrene, 4-chlorostyrene, 2,4-dichlorostyrene. Furthermore, the above thermoplastic styrene-acrylonitrile copolymers may be replaced wholly or partially by other thermoplastic polymers, such as polyvinylchloride and copolymers of a major proportion of vinyl chloride with a minor proportion of another copolymerizable monomer as for instance vinylidenechloride, vinylacetate.

The blending of the elastic and of the thermoplastic copolymers is preferably carired out by mixing the latices of said copolymers as they are obtained by emulsion polymerization. These mixtures are then subjected to coagulation by well known methods. The coagulate is washed, dried and transformed into the cross-linked state by heating it to temperatures of about 100–220° C. for a period of time as it is customary on granulating the resulting powder. Moreover, the mixture of the latices may be compounded before coagulation with aqueous emulsions or dispersions of pigments, stabilizers and plasticizers. The process of the present invention is further illustrated by the following examples the parts indicated being parts by weight.

EXAMPLE 1

330 parts of a sheet of a copolymer consisting of 65% by weight of bound butadiene and 35% by weight of bound acrylonitrile having a plasticity number (Defo value) 1350/35.7, are milled for 90 minutes on a roller mill the rolls of which are heated to 160° C. while the circulating sheet is cut from time to time. The copolymer assumes a strong dark-brown coloration. The proportion which has become insoluble in methyl ethyl ketone amounts to 60%. 670 parts of an acrylonitrile styrene copolymer containing 27.1% by weight of bound acrylonitrile as well as 50 parts of titanium dioxide (intrinsic viscosity of 1.20) is added within 10 minutes on the roller to the pretreated copolymer. The blend forms a smoothly circulating bright sheet. Test samples prepared from the blend show the physical properties listed in Table I. If the above copolymer of butadiene and acrylonitrile is replaced by a copolymer of butadiene, 35% by weight of bound acrylonitrile and 8% by weight of bound methacrylic acid of the plasticity number (Defo value) 1850/36.4, a proportion of 62% being insoluble in methyl ethyl ketone, is obtained within only 13 minutes at the same temperature, while the copolymer retains its original light color. After compounding 670 parts of the aforesaid acrylonitrile styrene copolymer and 50 parts of titanium dioxide, test samples prepared from the mixture show the test values indicated in Table I. Table I shows that the properties of the mixture with the elastomer component carrying carboxyl groups is at least identical with the mixture being free of carboxyl groups, though more than 85% of the time required for cross-linking were saved.

Table 1
PHYSICAL PROPERTIES OF THE BLENDS

| | Elastomeric Component | |
|---|---|---|
| | A | B |
| | Butadiene acrylonitrile | Butadiene acrylonitrile with 8 parts of methacrylic acid |
| Impact strength (kg. cm./cm.$^2$) | 104 | 106 |
| Impact strength notched (kg. cm./cm.$^2$): | | |
| at 20° C | 42 | 43 |
| at 0° C | 27 | 27 |
| at 15° C | 14 | 16 |
| Bounding strength (kg./cm.$^2$) | 685 | 691 |
| Compression strength (kg./cm.$^2$) | 527 | 513 |
| Tensile strength (kg./cm.$^2$) | 407 | 420 |

The above copolymer of butadiene and acrylonitrile is obtained in the following manner:

64 parts of butadiene and 36 parts of acrylonitrile are emulsified in a solution of 5 parts of the sodium salt of an alkylsulfonic acid having about 16 carbon atoms in 150 parts of water. To the emulsion there are added 0.3 part of n-dodecylmercaptane and 0.1 part of the sodium salt of an alkylsulfinic acid having about 16 carbon atoms, whereafter the pH-value is brought to 3 by addition of sulfuric acid. The polymerization starts and is continued at a temperature of 20° C. It is interrupted by addition of 1 part of sodium dithionite after 80 percent of the monomers are copolymerized. The latex is stabilized by addition of 2 parts of bi-(6.cyclohexyl-4-cresyl-2)-methane. The latex is coagulated in known manner, washed and dried.

For producing the corresponding copolymer containing carboxyl groups 56.5 parts of butadiene, 35.5 parts of acrylonitrile and 8 parts of methacrylic acid are polymerized in the same manner as described above.

The above thermoplastic copolymer is produced as follows:

73 parts of styrene, 27 parts of acrylonitrile are emulsified in a solution of 2 parts of the above emulsifying agent in 150 parts of water. After addition of 0.8 part of sodium metabisulfite and 0.4 part of potassium persulfate, and 0.2 part of n-dodecylmercaptane polymerization is carried through at 50° C. and at a pH-value of 2–3. After 95 percent of the monomers are polymerized polymerization is interrupted and the latex is worked up as disclosed above.

EXAMPLE 2

If instead of the copolymer of 57 percent by weight of butadiene, 35 percent by weight of acrylonitrile and 8 percent of methacrylic acid which is described in Example 1, 330 parts of a copolymer of 61 percent by weight of butadiene, 4 percent by weight of methacrylic acid and 35 percent by weight of acrylonitrile with the plasticity number (Defo value) 1200/32.2, are used, it takes 18 minutes, heating at 160° C. to obtain a proportion of 63.5 percent which is insoluble in methyl ethyl ketone while the copolymer retains its original light color. When increasing the proportion of methacrylic acid in the above copolymer to 12 percent by weight and using the same amount of acrylonitrile it takes only 9 minutes heating at 160° C. to produce a gel having a proportion of 61.2 percent which is insoluble in methyl ethyl ketone. After adding 670 parts of the copolymer described in Example 1 consisting of acrylonitrile and styrene, as well as 50 parts of titanium dioxide, test samples are prepared having properties listed in the following Table II:

Table II
PHYSICAL PROPERTIES OF THE BLENDS

| | Elastomeric Component | |
| --- | --- | --- |
| | C | D |
| | Butadiene acrylonitrile with 4 parts of methacrylic acid | Butadiene acrylonitrile with 12 parts of methacrylic acid |
| Impact strength (kg. cm./cm.$^2$) | 106 | 115 |
| Impact strength notched (kg. cm./cm.$^2$): | | |
| at 20° C | 38 | 44 |
| at 0° C | 24 | 26 |
| at −15° C | 8 | 12 |
| Bounding strength (kg./cm.$^2$) | 710 | 760 |
| Compression strength (kg./cm.$^2$) | 543 | 590 |
| Tensile strength (kg./cm.$^2$) | 416 | 445 |

The copolymers of butadiene, acrylonitrile and methacrylic acid are produced according to the process of Example 1, while using 60.5 parts of butadiene, 35.5 parts of acrylonitrile, 4 parts of methacrylic acid, respectively 52.5, 35.5 and 12 parts of said monomers.

EXAMPLE 3

300 parts of a copolymer of butadiene and 35 percent by weight of acrylonitrile having the plasticity number (Defo value) 1350/35.7, are milled for 27 minutes on a rubber mill heated to 165° C., while cutting the sheet from time to time. After this period, the substantially dark-brown colored copolymer has a gel proportion of 72 percent which is insoluble in methyl ethyl ketone. By adding 700 parts of a copolymer of styrene and 28.5 percent by weight of acrylonitrile of the intrinsic viscosity 1.02, and 25 parts of titanium dioxide a blend is obtained, the physical properties of which are listed in Table III. When using a copolymer of butadiene, 35 percent by weight of acrylonitrile and 4 percent by weight of acrylic acid, having the plasticity number (Defo value) 1025/24.5, the reaction carried out at 165° C. requires only 9 minutes to produce a gel having an insoluble proportion of 70.3 percent in methyl ethyl ketone. The physical properties of the mixture obtained from the gel under otherwise equal conditions with the acrylonitrile-styrene copolymer are as well compiled in Table III.

Table III
PHYSICAL PROPERTIES OF THE BLENDS

| | Elastomeric Component | |
| --- | --- | --- |
| | E | F |
| | Butadiene acrylonitrile | Butadiene acrylonitrile with 4 parts of acrylic acid |
| Impact strength (kg. cm./cm.$^2$) | 132 | 137 |
| Impact Strength notched (kg. cm./cm.$^2$): | | |
| at 20° C | 34 | 32 |
| at 0° C | 17 | 15 |
| at −15° C | 6 | 8 |
| Bounding strength (kg./cm.$^2$) | 815 | 862 |
| Compression strength (kg./cm.$^2$) | 626 | 743 |
| Tensile strength (kg./cm.$^2$) | 460 | 493 |

EXAMPLE 4

By treating, as described in Example 1, 325 parts of a copolymer of butadiene, 35 percent by weight of acrylonitrile, having the plasticity number 1000/25.3, on a rubber mill at 160° C. for 82 minutes, a copolymer is obtained which is insoluble to 60.5 percent in methyl ethyl ketone. After compounding 675 parts of a copolymer of styrene and 27.7 percent by weight of acrylonitrile of the intrinsic viscosity 1.25, a blend is obtained, having the mechanical properties compiled in Table IV. If a copolymer of butadiene, 35 percent by weight of acrylonitrile and 2 percent by weight of methacrolein, having the plasticity number (Defo value) 675/19.5, is used instead of the above defined elastomeric component, the reaction carried out at 160° C., requires only 24 minutes to produce a product having an insoluble proportion of 61.3 percent of methyl ethyl ketone. In contrast to the aforesaid copolymer only a very slight discoloration occurs. 675 parts of the above acrylonitrile-styrene copolymer are thereafter compounded with said copolymer blend. The figures of Table 4 show that the only slightly colored blend containing bound methacrolein possesses the same properties as they are obtained from the butadiene acrylonitrile copolymer, although the total processing time was substantially shortened.

Table IV
PHYSICAL PROPERTIES OF THE BLENDS

| | Elastomeric Component | |
| --- | --- | --- |
| | G | H |
| | Butadiene acrylonitrile | Butadiene acrylonitrile with 2 parts of methacrolein |
| Impact strength (kg. cm./cm.$^2$) | 117 | 108 |
| Impact strength notched (kg. cm./cm.$^2$): | | |
| at 20° C | 36 | 35 |
| at 0° C | 15 | 16 |
| at −15° C | 11 | 10 |
| Bounding strength (kg./cm.$^2$) | 720 | 730 |
| Compression strength (kg./cm.$^2$) | 542 | 505 |
| Tensile strength (kg./cm.$^2$) | 410 | 395 |

The copolymer containing bound methacrolein is prepared according to the prescription of Example 1, while using 62 parts of butadiene, 36 parts of acrylonitrile, 2 parts of methacrolein.

EXAMPLE 5

1000 parts of the 30 percent latex of a copolymer of butadiene, 35 percent by weight of acrylonitrile and 0.5 percent by weight of divinylbenzene, which latex is produced according to the prescription of Example 1, are mixed with 2058 parts of the 34 percent latex of a copolymer of styrene and 25.2 percent by weight of acrylonitrile, having the intrinsic viscosity 1.04, so as to obtain a proportion of 300 parts of the elastomeric component per 700 parts of the thermoplastic copolymer. After adding an aqueous dispersion of 50 parts of titanium dioxide, the mixture of the latices is coagulated by addition of common salt solution, the coagulate filtered off and washed with water until the positive reaction on bound chlorine disappears. After drying at 80° C. a white powder is obtained from which 30 mm. thick strands are obtained by molding by means of a screw-press heated to 170° C., having a screw diameter of 30 mm. These strands are comminuted to a granulate of 2 to 3 mm. diameter. The physical properties of this dried powder and of the granulate are compiled in Table V. The figures show that the impact strength notched of samples prepared from the powder or the granulate is relatively low.

Table V
PHYSICAL PROPERTIES OF THE BLENDS

| | Powder | Granulate |
|---|---|---|
| Impact strength (kg. cm./cm.²) | 113 | 111 |
| Impact strength notched (kg. cm./cm.²): | | |
| at 20° C | 9.0 | 9.5 |
| at 0° C | 5.0 | 6.0 |
| Bounding strength (kg./cm.²) | 623 | 637 |
| Compression strength (kg./cm.²) | 475 | 475 |
| Tensile strength (kg./cm.²) | 390 | 380 |

EXAMPLE 6

Instead of the elastic copolymer described in Example 5, which consists of butadiene, 35 percent by weight of acrylonitrile and 0.5% by weight of divinylbenzene, 1025 parts of the 29.5 percent latex of the copolymer of butadiene, 35 percent by weight of acrylonitrile, 0.5 percent by weight of divinylbenzene, and 1.5 percent by weight of methacrylic acid are used. The latex is worked up in the same manner as disclosed in the foregoing example. The physical values of test bodies prepared from the powder and the granulate are listed in Table VI. The small amount of 1.5 percent by weight of methacrylic acid is responsible for the increase of the impact strength notched by more than 100 percent of the test body prepared from the powder in comparison with the values obtained when following the method of Example 5. However, the impact strength notched is increased to the value obtained in the manufacture of the blend from the isolated polymers on the rubber mill only by granulation at higher temperature (about 140–170° C.).

Table VI
PHYSICAL PROPERTIES OF THE BLENDS

| | Powder | Granulate |
|---|---|---|
| Impact strength (kg. cm./cm.²) | 94 | 114 |
| Impact strength notched (kg. cm./cm.²): | | |
| at 20° C | 22 | 40 |
| at 0° C | 8 | 18 |
| Bounding strength (kg./cm.²) | 622 | 656 |
| Compression strength (kg./cm.²) | 430 | 470 |
| Tensile strength (kg./cm.²) | 412 | 395 |

EXAMPLE 7

1052 parts of the 28.5 percent latex of a copolymer of butadiene, 35 percent by weight of acrylonitrile, 0.5 percent by weight of divinylbenzene and 3.0 percent by weight of methacrylic acid, which latex is prepared by emulsion polymerization according to the process of Example 1, are mixed with 2090 parts of the 33.5 percent latex of a copolymer of styrene and 20.0 percent by weight of acrylonitrile, having the instrinsic viscosity 1.2, so as to obtain a proportion of 300 parts of the elastomeric component per 700 parts of the acrylonitrile-styrene copolymer. After adding an aqueous dispersion containing 25 g. titanium dioxide, the latex mixture is coagulated and dried as described in Example 5. The following table shows the test values of the powder and the granulate prepared by the method described in Example 5. As shown in the preceding example, heating for a short period is sufficient to substantially improve the impact strength notched of the test bodies.

Table VII
PHYSICAL PROPERTIES OF THE BLENDS

| | Powder | Granulate |
|---|---|---|
| Impact strength (kg. cm./cm.²) | 114 | 111 |
| Impact strength notched (kg. cm./cm.²): | | |
| at 20° C | 16 | 37 |
| at 0° C | 7 | 23 |
| Bounding strength (kg./cm.²) | 643 | 634 |
| Compression strength (kg./cm.²) | 408 | 412 |
| Tensile strength (kg./cm.²) | 390 | 405 |

EXAMPLE 8

597 parts of the 29.3 percent latex of the copolymer of butadiene, 35 percent by weight of acrylonitrile, 0.5 percent by weight of divinylbenzene, and 3.0 percent of methacrylic acid are mixed with 583 parts of the 30 percent latex of a copolymer of butadiene, 26.0 percent by weight of acrylonitrile, 0.5 percent by weight of divinylbenzene and 3.0 percent by weight of methacrylic acid, as well as with 2004 cc. of the 32.3 percent latex of a copolymer of styrene and 25 percent by weight of acrylonitrile, having the intrinsic viscosity 1.15. The components are chosen so that the resultant mixture when isolated contains a proportion of 175 parts of the elastomeric component per 650 parts of the acrylonitrile-styrene copolymer. After coagulating the mixed latices as described in Example 5 test articles are produced from the powder formed as well as from the granulate obtained by the method of Example 5, which test articles show the values blend proves in the Table VIII below. On account of the larger proportion of the elastomeric component having a reduced acrylonitrile proportion, the blend-proves to be especially stable to low temperatures.

Table VIII
PHYSICAL PROPERTIES OF THE BLENDS

| | Powder | Granulate |
|---|---|---|
| Impact strength (kg. cm./cm.²) | 86 | 82 |
| Impact strength notched (kg. cm./cm.²): | | |
| at 20° C | 32 | 53 |
| at 0° C | 27 | 50 |
| at −15° C | 14 | 44 |
| at −30° C | 8 | 26 |
| Bounding strength (kg./cm.²) | 440 | 435 |
| Compression strength (kg./cm.²) | 292 | 285 |
| Tensile strength (kg./cm.²) | 265 | 271 |

EXAMPLE 9

300 parts of a copolymer of 65 percent by weight of butadiene and 35 percent by weight of acrylonitrile, having the plasticity number 1200/34.0, are milled for 85 minutes on a rubber mill the rolls of which are heated to 160° C. while the circulating sheet is cut from time to time. After this treatment the copolymer has a proportion of 65% which is insoluble in methyl ethyl ketone. The thus treated copolymer is then compounded within 10 minutes on the roll with 700 parts of an acrylonitrile-styrene copolymer of the intrinsic viscosity 1.3 containing 24.8 percent by weight of bound acrylonitrile and 100 parts of titanium dioxide. Test articles prepared from the mixture show the mechanical properties indicated in the Table IX (a). If instead of the aforesaid butadiene acrylonitrile copolymer, a copolymer of 61 percent of butadiene, 36 percent of acrylonitrile and 3 percent of methyleneacetylacetone, having the plasticity number (Defo value) 2000/35.0, is used a copolymer having an insoluble proportion of 61% in methyl ethyl ketone is obtained already after milling at 160° C. for 12 minutes. By incorporating on the rolls within 10 minutes, 700 parts of the aforesaid styrene acrylonitrile copolymer and 100 parts of titanium dioxide a blend of the properties indicated in Table IX (b) is obtained.

Table IX
MECHANICAL PROPERTIES OF THE BLENDS

| | (a) Butadiene acrylonitrile | (b) Butadiene acrylonitrile methylene acetyl acetone |
|---|---|---|
| Impact strength (kg. cm./cm.$^2$) | 102 | 100.5 |
| Impact strength notched (kg. cm./cm.$^2$): | | |
| at 20° C | 42 | 40 |
| at 0° C | 11 | 11 |
| Bounding strength (kg./cm.$^2$) | 685 | 710 |
| Compression strength (kg./cm.$^2$) | 510 | 490 |
| Tensile strength (kg./cm.$^2$) | 400 | 380 |

The copolymer containing methyleneacetylacetone is obtained in the following manner:

61 parts of butadiene, 36 parts of acrylonitrile, 3 parts of methyleneacetylacetone are emulsified in a solution of 5 parts of sodium alkylsulfonate (alkyl residue having about 16 C-atoms) and 0.3 part of sodium pyrophosphate in 150 parts of water. After addition of 0.6 part of n-dodecylmercaptane, 0.3 part of potassiumpersulfate the emulsion is polymerized at a pH-value of 6–7.5 and a temperature of 25° C. until 80 percent of the monomers are polymerized. The further procedure corresponds to that of Example 1.

EXAMPLE 10

1000 parts of a 30 percent latex obtained by emulsion polymerization of butadiene, 35 percent by weight of acrylonitrile and 0.5 percent of divinylbenzene having the plasticity number 1100/37.0, are mixed with 2058 parts of the 34 percent latex of a copolymer of styrene, 20.5 percent by weight of acrylonitrile having an intrinsic viscosity 1.15. The elastomeric component and the thermoplastic component are present in a proportion of 30:70. After adding 150 parts of titanium dioxide in the form of an aqueous dispersion, the mixture is coagulated by common salt solution, the resultant coagulate separated, washed until free of salt and dried at 90° C. The dried material is homogenized on mixing rolls, heated to 165° C., removed in strips and cut in a beater mill. The material shows the properties indicated in Table X. If instead of the abovesaid elastomeric component, 915 parts of a 32.8 percent latex obtained by emulsion copolymerization of 61 percent by weight of butadiene, 36 percent by weight of acrylonitrile and 3 percent by weight of methyleneacetoacetic acid according to the process of the preceding example (plasticity number of the copolymer 1500/39.2), the material having the properties indicated in Table X (b), is obtained.

Table X
MECHANICAL PROPERTIES OF THE BLENDS

| | (a) Butadiene acrylonitrile divinylbenzene | (b) Butadiene acrylonitrile-methylene acetoacetic acid |
|---|---|---|
| Impact strength (kg. cm./cm.$^2$) | 104 | 103 |
| Impact strength notched (kg. cm./cm.$^2$): | | |
| at 20° C | 12 | 45 |
| at 0° C | 6 | 7 |
| Bounding strength (kg./cm.$^2$) | 640 | 701 |
| Compression strength (kg./cm.$^2$) | 460 | 440 |
| Tensile strength (kg./cm.$^2$) | 380 | 378 |

In Table X is shown that the process described in this example produces within a very short time a material having optimum mechanical properties.

EXAMPLE 11

Similar to the process described in the preceding example the latices of an elastomeric component, of a thermoplastic component and of an aqueous dispersion of titanium dioxide are mixed, i.e. 923 parts of a 32.5% latex of the copolymer of butadiene, 35.5 percent by weight of acrylonitrile and 3 percent by weight of methacrylamide-N-methylolmethyl ether (the copolymer having a plasticity number (Defo value) of 1900/45), 1892 parts of a 37 percent latex of the copolymer of 80 percent by weight of styrene, and 20 percent by weight of acrylonitrile, having an intrinsic viscosity of 1.15 and 100 parts of titanium dioxide in aqueous dispersion. As described in the preceding example the mixture is precipitated, washed and dried. The resultant crumbly material is gelled on a two-screw-extruding apparatus and extruded in form of a sheet which can be granulated by conventional methods. In this manner a blend having the properties listed in the following Table XI, is obtained.

Table XI

| | |
|---|---|
| Impact strength (kg. cm./cm.$^2$) | 102 |
| Impact strength notched (kg. cm./cm.$^2$): | |
| At 20° C. | 40 |
| At 0° C. | 6.5 |
| Bounding strength (kg./cm.$^2$) | 729 |
| Compression strength (kg./cm.$^2$) | 448 |
| Tensile strength (kg./cm.$^2$) | 407 |

EXAMPLE 12

Analogous to the process described in the preceding example, 967 parts of the 31 percent latex of a copolymer of 62 percent by weight butadiene with 35 percent by weight of acrylonitrile and 3 percent by weight of methacrylic acid-β-ureidoethyl ester, having a plasticity number (Defo value) of 1600/44.0, are mixed with 1892 parts of a 37 percent latex of a copolymer of 79.3 percent by weight of styrene with 20.7 percent by weight of acrylonitrile, having an intrinsic viscosity of 1.2 and worked up according to the process of the preceding example. The dried powder is compounded on a suitable internal mixing apparatus with 150 parts of titanium dioxide, whereafter the pigmented mixture is granulated as described in the preceding example. The blend shows the following properties:

Table XII

| | |
|---|---|
| Impact strength (kg. cm./cm.$^2$) | 89 |
| Impact strength notched (kg. cm./cm.$^2$): | |
| At 20° C. | 40.2 |
| At 0° C. | 15.7 |
| Bounding strength (kg./cm.$^2$) | 650 |
| Compression strength (kg./cm.$^2$) | 470 |
| Tensile strength (kg./cm.$^2$) | 360 |

EXAMPLE 13

When using instead of the elastomeric component described in the preceding example the latex of a copolymer of butadiene, 35 percent by weight of acrylonitrile and 3 percent by weight of β-ureidoethylvinyl ether, having a plasticity number (Defo value) of 1900/41, and following the procedure described in the preceding example a material having the following properties is obtained:

Table XIII

| | |
|---|---|
| Impact strength (kg. cm./cm.$^2$) | 92 |
| Impact strength notched (kg. cm./cm.$^2$): | |
| At 20° C. | 38 |
| At 0° C. | 14 |
| Bounding strength (kg./cm.$^2$) | 660 |
| Compression strength (kg./cm.$^2$) | 450 |
| Tensile strength (kg./cm.$^2$) | 370 |

EXAMPLE 14

1000 parts of the 30 percent latex of a copolymer of 63 percent by weight of butadiene, 35 percent by weight of acrylonitrile and 2 percent of the ester of methacrylic acid and 4-hydroxymethyl-1.1-dimethyl-dioxolane, having a plasticity number (Defo value) of 900/34.5, are mixed with 1892 parts of the 37 percent latex of a copolymer of 80 percent by weight of styrene and 20 percent by weight of acrylonitrile and worked up as described in Example 10. The dried coagulate is then treated at 160° C. for 10 minutes on mixing rolls, removed in strips and comminuted to a granulate. Test articles having the following mechanical properties were produced at 240° C. by injection molding.

Table XIV

| | |
|---|---|
| Impact strength (kg. cm./cm.$^2$) | 97 |
| Impact strength notched (kg. cm./cm.$^2$): | |
| At 20° C. | 36 |
| At 0° C. | 12 |
| Bounding strength (kg./cm.$^2$) | 690 |
| Compression strength (kg./cm.$^2$) | 478 |
| Tensile strength (kg./cm.$^2$) | 362 |

The elastic copolymer of Examples 10–14 are produced according to the process of Example 9, while using the respective monomers.

It is also possible to introduce the self-cross-linking group into appropriate copolymers, for instance by reacting copolymers containing carbonamide groups with formaldehyde, if desired in the presence of an alcohol, whereby copolymers are obtained which contain methylol- or methylolether groups.

We claim:

1. As a novel composition, a composite thermoplastic mixture of (1) an elastomeric copolymer of 35–94.9 parts by weight of a butadiene, 5–45 parts by weight of acrylonitrile and 0.1–20 parts by weight of a further monoethylenically unsaturated monomer which is copolymerizable with butadiene and acrylonitrile, said further monomer containing a cross-linking group which is selected from the class consisting of carboxyl, carbamyl,  methylol, ureido,

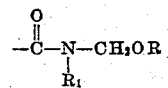

wherein R is alkyl and R₁ is a member of the group consisting of hydrogen, alkyl and aryl,

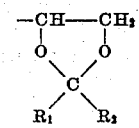

wherein R₁ and R₂ are each members of the group consisting of hydrogen and hydrocarbon, and groups of the formula:

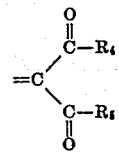

wherein R₄ and R₅ stand for a member of the group consisting of (a) a hydrocarbon radical, and (b) a hydrocarbon radical which is bound to the carbonyl group thru an oxygen atom, and (2) a thermoplastic copolymer of 95–55 parts by weight of styrene and 5–45 parts by weight of acrylonitrile, said copolymer (1) being present in proportions of 10 to 75 parts by weight and said copolymer (2) in proportions of 90 to 25 parts by weight.

2. The composition of claim 1, wherein the elastomeric copolymer (1) contains 45–94 parts by weight of a butadiene, 5–45 parts by weight of acrylonitrile, and 1–10 parts by weight of said further monoethylenically unsaturated monomer.

3. The process for preparing the composite thermoplastic mixture of claim 1 which comprises subjecting the elastomeric copolymer to a heat-treatment at temperatures of about 100 to 220° C. until part of said elastomeric copolymer has become insoluble in toluene and methyl ethyl ketone, and thereafter mixing said pretreated elastomeric component with the thermoplastic component.

4. The process for producing the composite thermoplastic mixture of claim 1, which comprises producing the components (1) and (2) of said mixture by the process of emulsion polymerization, mixing the latices obtained by said process, coagulating the latices and heating the coagulate to temperatures of about 100 to 220° C., until part of the elastic component (1) has become insoluble in toluene.

References Cited in the file of this patent

UNITED STATES PATENTS

| | | |
|---|---|---|
| 2,439,202 | Daly | Apr. 6, 1948 |
| 2,442,588 | D'Alelio | June 1, 1948 |
| 2,550,139 | Daly | Apr. 24, 1951 |
| 2,600,024 | Romeyn et al. | June 10, 1952 |
| 2,652,384 | Sayko et al. | Sept. 15, 1953 |
| 2,698,313 | Daly | Dec. 28, 1954 |